US010592422B2

(12) United States Patent
Barrick et al.

(10) Patent No.: US 10,592,422 B2
(45) Date of Patent: Mar. 17, 2020

(54) DATA-LESS HISTORY BUFFER WITH BANKED RESTORE PORTS IN A REGISTER MAPPER

(71) Applicant: International Business Machines Corporation, Armonk, NY (US)

(72) Inventors: Brian D. Barrick, Pflugerville, TX (US); Gregory W. Alexander, Pflugerville, TX (US); Dung Q. Nguyen, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 259 days.

(21) Appl. No.: 15/842,929

(22) Filed: Dec. 15, 2017

(65) Prior Publication Data

US 2019/0188140 A1    Jun. 20, 2019

(51) Int. Cl.
| G06F 12/02 | (2006.01) |
| G06F 12/0875 | (2016.01) |
| G06F 12/0804 | (2016.01) |
| G06F 3/06 | (2006.01) |
| G06F 9/38 | (2018.01) |
| G06F 9/30 | (2018.01) |

(52) U.S. Cl.
CPC .......... *G06F 12/0875* (2013.01); *G06F 3/065* (2013.01); *G06F 3/067* (2013.01); *G06F 3/0619* (2013.01); *G06F 9/30043* (2013.01); *G06F 9/3836* (2013.01); *G06F 12/0804* (2013.01); *G06F 2212/1016* (2013.01); *G06F 2212/452* (2013.01); *G06F 2212/621* (2013.01)

(58) Field of Classification Search
CPC ...................................................... G06F 12/02
See application file for complete search history.

(56) References Cited

U.S. PATENT DOCUMENTS

| 5,581,775 | A | 12/1996 | Katz et al. |
| 6,070,235 | A | 5/2000 | Cheong et al. |
| 9,740,620 | B2 * | 8/2017 | Ayub .................. G06F 12/0875 |
| 10,248,426 | B2 * | 4/2019 | Barrick ................ G06F 9/3857 |
| 2015/0286482 | A1 | 10/2015 | Espasa et al. |
| 2017/0109166 | A1 | 4/2017 | Eisen et al. |

OTHER PUBLICATIONS

Envisionware®, "PC Reservation® Technical Manual Version 3.5", Next Generation Self Service for Libraries, copyright © 2000-2011, EnvisionWare, Inc., 312 pages.

(Continued)

*Primary Examiner* — Cheng Yuan Tseng
(74) *Attorney, Agent, or Firm* — Edward J. Wixted, III

(57) ABSTRACT

A microprocessor has a data-less history buffer. Operands associated with a program instructions are stored in logical registers (LREGs) which are resolvable to physical registers that are not part of the history buffer. Register re-naming maintains integrity of data dependencies for instructions processed out of program order. The history buffer has pointers (RTAGs) to the LREGs. Entries in the history buffer are grouped into ranges. A mapper has a single port associated with each LREG, and each port receives data, from a single range of entries in the history buffer. Multiple entries, one from each range, may be restored concurrently from the history buffer to the mapper.

19 Claims, 12 Drawing Sheets

(56) References Cited

OTHER PUBLICATIONS

Mutlu, Onur, "15-740/18-740, Computer Architecture, Lecture 10: Out-of-Order Execution", Carnegie Mellon University, Fall 2011, Oct. 3, 2011, 26 pages.
Wikipedia, "Harvard architecture", From Wikipedia, the free encyclopedia, printed on Aug. 16, 2017, 1 page.
Wikipedia, "Out-of-order execution", From Wikipedia, the free encyclopedia, printed on Aug. 16, 2017, 1 page.
Wikipedia, "Register renaming", From Wikipedia, the free encyclopedia, printed on Aug. 16, 2017, 3 pages.
"Structure of Computer Systems", Course 5 The Central Processing Unit—CPU, printed on Aug. 16, 2017, 4 pages.

* cited by examiner

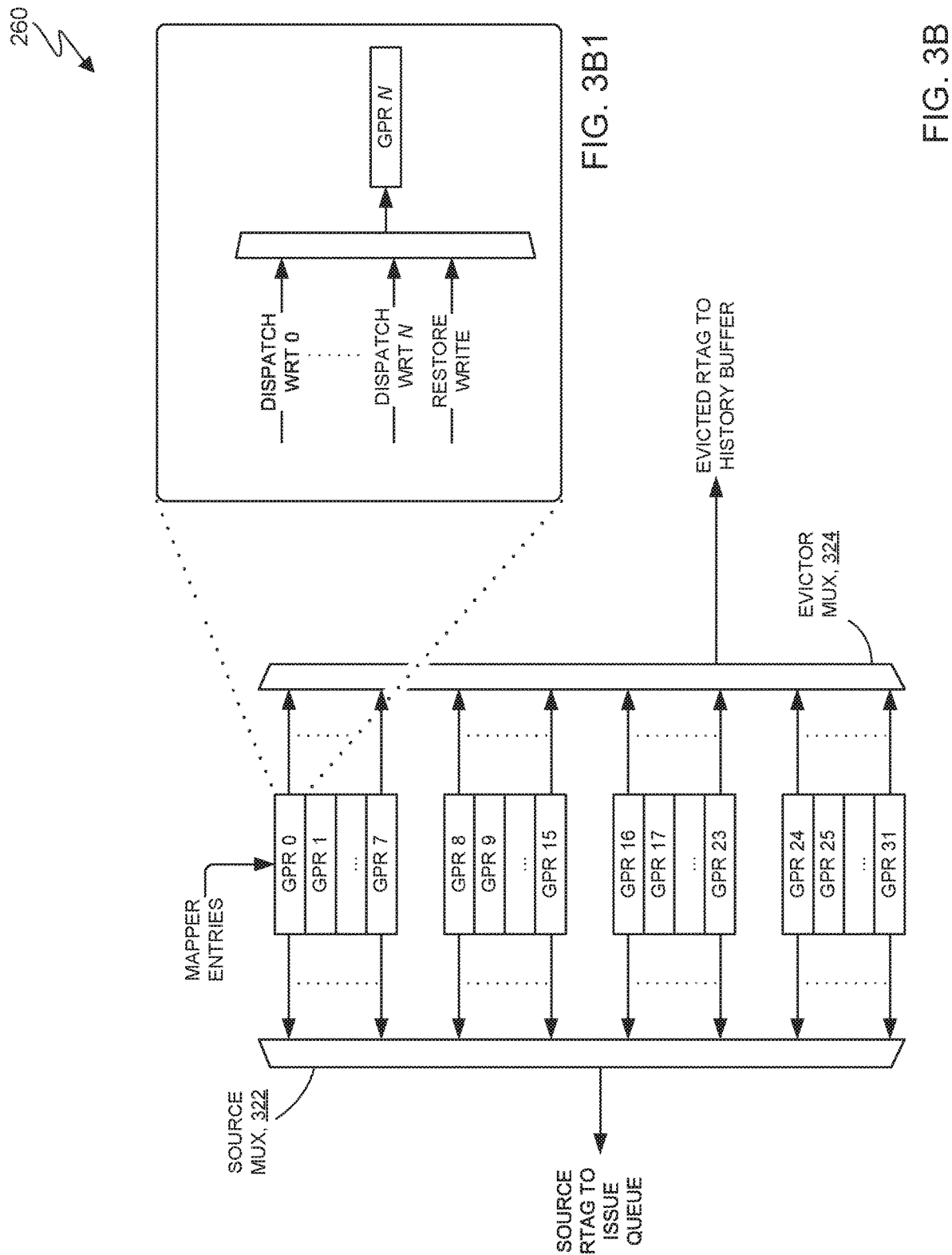

DATA-LESS HISTORY BUFFER WITH BANKED RESTORE PORTS IN A REGISTER MAPPER

BACKGROUND OF THE INVENTION

The present invention relates generally to the field of microprocessor design, and more particularly to design of a microprocessor history buffer.

Some conventional processors use a method called pipelining to improve performance wherein computation is broken up into steps called pipeline stages. For instance, a classical pipeline consists of five stages: fetch, decode, execute, memory, writeback. A branch instruction is an instruction that causes a processor to fetch from a new location, sometimes based on a condition. This condition cannot be fully determined until the branch instruction is executed. To keep the pipeline from stalling while waiting for execution of each branch that is encountered, some processors implement a behavior called branch prediction, where the processor predicts the direction a branch will take, and continues fetching new instructions from the predicted location. If, when the branch is executed, it is determined that the prediction was wrong, instructions younger than the branch that are on the wrongly predicted path must be removed from the pipeline, and fetching must start again from the correct location. This is clearing out of younger instructions is called a pipeline flush (or simply, a flush.) A flush may occur for other reasons as well, for instance: processor state changes that cause subsequent fetches to become invalid; or certain storage-based conditions.

Register renaming is another conventional method used to improve processor performance. A structure called a mapper assigns a physical location (PREG, also sometimes herein referred to as "register tag" or "RTAG") to a logical register (LREG), to create a LREG to PREG mapping. This allows multiple writers (program instructions) to write to the same LREG while actually writing to different (renamed) PREGs. The processor may then execute (issue) the instructions in an order different from program order, (called out of order execution). The LREG to PREG mapping occurs early in the pipeline process and is performed in program order. Register renaming and corresponding LREG to PREG mapping enables the pipelined instructions to execute concurrently and/or out of order while maintaining integrity of any dependencies that may exist between and among the instructions.

SUMMARY

According to an aspect of the present invention, there is a method, computer program product and/or system that performs the following operations (not necessarily in the following order): (i) providing a first port connected to a first memory structure, a second port connected to a second memory structure, and a first restore lane that interconnects the first port and the second port; (ii) providing a third port connected to the first memory structure, a fourth port connected to the second memory structure, and a second restore lane that interconnects the third port and the fourth port; (iii) storing a first dataset, a second dataset, a third dataset, and a fourth dataset, respectively in a first storage location, a second storage location, a third storage location, and a fourth storage location of the first memory structure; (iv) receiving an instruction flush signal; (v) in response to receiving the instruction flush signal: (a) concurrently sending the first dataset and the third dataset to the second memory structure, via the first restore lane and the second restore lane respectively, (b) concurrently sending the second dataset and the fourth dataset to the second memory structure, via the first restore lane and the second restore lane respectively; (vi) receiving an instruction dispatch signal; (vii) in response to receiving the instruction dispatch signal, reading the second memory structure to determine a register source mapping based on at least one of the first dataset, the second dataset, the third dataset and the fourth dataset stored therein. The first storage location and the third storage location are connected to the first port exclusively. The second storage location and the fourth storage location are connected to the third port exclusively.

According to a further aspect of the present invention, there is a microprocessor that performs the following operations (not necessarily in the following order): (i) providing a first port connected to a first memory structure, a second port connected to a second memory structure, and a first restore lane that interconnects the first port and the second port; (ii) providing a third port connected to the first memory structure, a fourth port connected to the second memory structure, and a second restore lane that interconnects the third port and the fourth port; (iii) storing a first dataset, a second dataset, a third dataset, and a fourth dataset, respectively in a first storage location, a second storage location, a third storage location, and a fourth storage location of the first memory structure; (iv) receiving an instruction flush signal; (v) in response to receiving the instruction flush signal: (a) concurrently sending the first dataset and the third dataset to the second memory structure, via the first restore lane and the second restore lane respectively, (b) concurrently sending the second dataset and the fourth dataset to the second memory structure, via the first restore lane and the second restore lane respectively; (vi) receiving an instruction dispatch signal; (vii) in response to receiving the instruction dispatch signal, reading the second memory structure to determine a register source mapping based on at least one of the first dataset, the second dataset, the third dataset and the fourth dataset stored therein. The first storage location and the third storage location are connected to the first port exclusively. The second storage location and the fourth storage location are connected to the third port exclusively.

BRIEF DESCRIPTION OF THE DRAWINGS

FIG. 3B is a functional block diagram showing a logical register/register tag (LREG/RTAG) mapper in accordance with at least one embodiment of the present invention;

FIG. 3B1 is a functional block diagram showing a detail of a logical register/register tag (LREG/RTAG) mapper, in accordance with at least one embodiment of the present invention;

DETAILED DESCRIPTION

Figure 1:
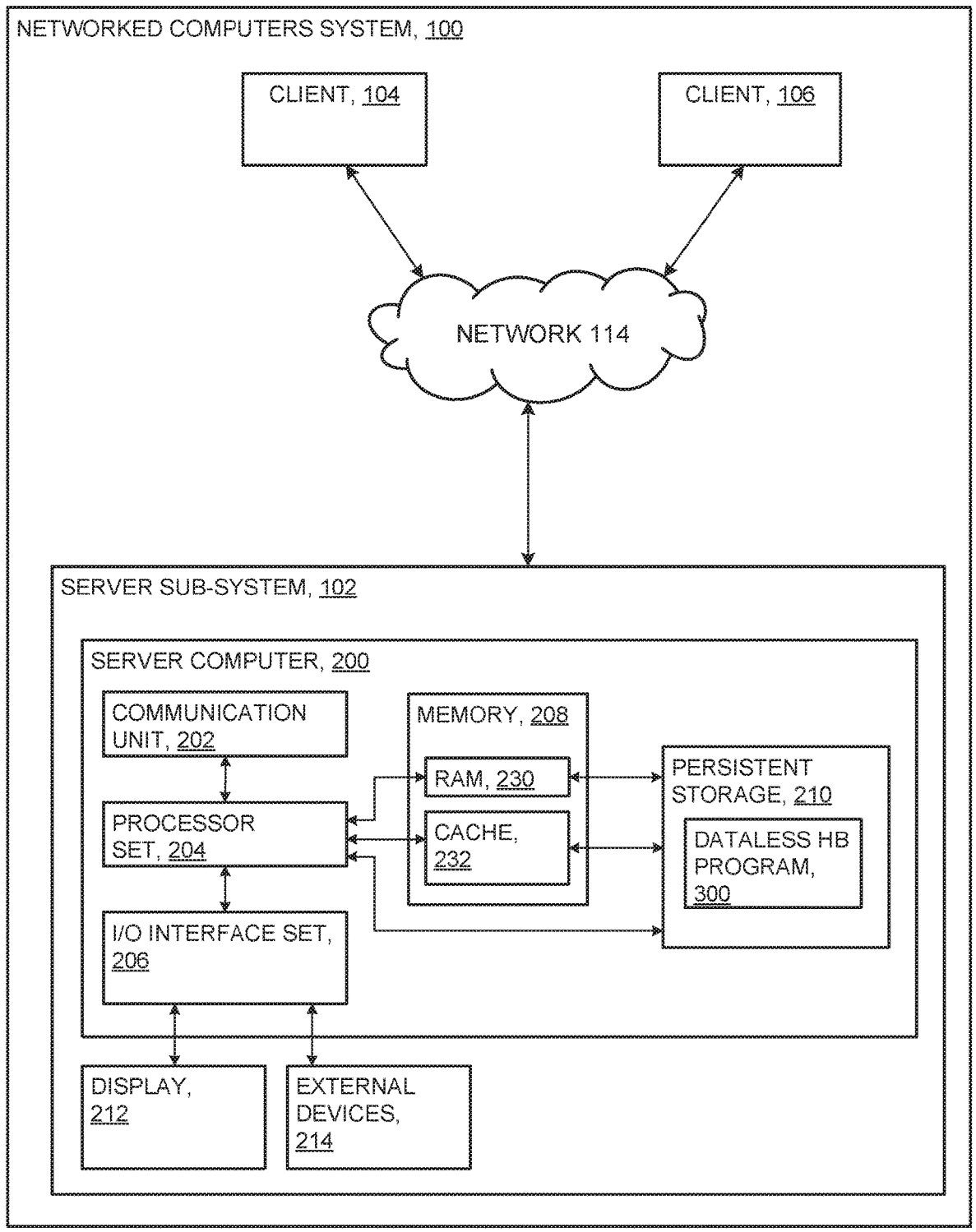
FIG. 1 is a functional block diagram showing a computing environment in accordance with at least one embodiment of the present invention.

In some embodiments of the present invention a microprocessor has a mapper comprising a working set and a history buffer. The working set includes the current dispatch-time value of logical register (LREG) to physical register (PREG) mappings. When a new register writer (a program instruction that writes a value to a LREG) is dispatched, the mapper: (i) places the previous mapping into a structure called a history buffer; and (ii) updates the working set to reflect a new LREG to PREG mapping. When a subsequent reader (a program instruction that reads the value) of the new LREG is dispatched, the working set provides the mapping needed to find the correct PREG from which to read the data. If the new writer successfully reaches completion without being flushed, then as part of the completion process, the PREG for the new writer becomes the new architected value and the previous PREG (and the associated LREG to PREG mapping) can be deallocated.

If a flush takes place, the corresponding mapping(s) in the working set mapper must be restored to the correct value(s) prior to flushing the associated instruction(s). For each affected LREG, the history buffer reads the entries for mappings that need to be restored to the working set, and sends them to the working set. This restoration process takes place before allowing a new reader of that LREG to be dispatched, to ensure that the new reader is mapped to the correct PREG.

Some embodiments of the present invention may include one, or more, of the following features, characteristics, and/or advantages: (i) restore ports from the history buffer are organized by logical register; (ii) increases the number of restores that can be made per restore cycle (compared to conventional systems) without increasing the number of write ports into the mapper; (iii) each mapper entry monitors a single restore port; and/or (iv) allows for faster restores (fewer cycles) to the mapper with no attendant increase in restore ports to the mapper.

This Detailed Description section is divided into the following sub-sections: (i) The Hardware and Software Environment; (ii) Example Embodiment; (iii) Further Comments and/or Embodiments; and (iv) Definitions.

I. The Hardware and Software Environment

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

An embodiment of a possible hardware and software environment for software and/or methods according to the present invention will now be described in detail with reference to the Figures. FIG. 1 is a functional block diagram illustrating various portions of networked computers system 100, including: server sub-system 102; client sub-systems 104 and 106; communication network 114; server computer 200; communication unit 202; processor set 204; input/output (I/O) interface set 206; memory device 208; persistent storage device 210; display device 212; external devices set 214; random access memory (RAM) devices 230; cache memory device 232; and data-less history buffer program 300.

Server sub-system 102 is, in many respects, representative of the various computer sub-system(s) in the present invention. Accordingly, several portions of server sub-system 102 will now be discussed in the following paragraphs.

Server sub-system 102 may be a laptop computer, tablet computer, netbook computer, personal computer (PC), a desktop computer, a personal digital assistant (PDA), a smart phone, or any programmable electronic device capable of communicating with the client sub-systems via network 114. Data-less history buffer program 300 is a collection of machine readable instructions and/or data that is used to create, manage and control certain software functions that will be discussed in detail, below, in the Example Embodiment sub-section of this Detailed Description section.

Server sub-system 102 is capable of communicating with other computer sub-systems via network 114. Network 114 can be, for example, a local area network (LAN), a wide area network (WAN) such as the Internet, or a combination of the two, and can include wired, wireless, or fiber optic connections. In general, network 114 can be any combination of connections and protocols that will support communications between server and client sub-systems.

Server sub-system 102 is shown as a block diagram with many double arrows. These double arrows (no separate reference numerals) represent a communications fabric, which provides communications between various components of server sub-system 102. This communications fabric can be implemented with any architecture designed for passing data and/or control information between processors (such as microprocessors, communications and network processors, etc.), system memory, peripheral devices, and any other hardware components within a system. For example, the communications fabric can be implemented, at least in part, with one or more buses.

Memory 208 and persistent storage 210 are computer-readable storage media. In general, memory 208 can include any suitable volatile or non-volatile computer-readable storage media. It is further noted that, now and/or in the near future: (i) external device(s) 214 may be able to supply, some or all, memory for server sub-system 102; and/or (ii) devices external to server sub-system 102 may be able to provide memory for server sub-system 102.

Data-less history buffer program 300 is stored in persistent storage 210 for access and/or execution by one or more of the respective computer processors 204, usually through one or more memories of memory 208. Persistent storage 210: (i) is at least more persistent than a signal in transit; (ii) stores the program (including its soft logic and/or data), on a tangible medium (such as magnetic or optical domains); and (iii) is substantially less persistent than permanent storage. Alternatively, data storage may be more persistent and/or permanent than the type of storage provided by persistent storage 210.

Data-less history buffer program 300 may include both machine readable and performable instructions and/or substantive data (that is, the type of data stored in a database). In this particular embodiment, persistent storage 210 includes a magnetic hard disk drive. To name some possible variations, persistent storage 210 may include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 210 may also be removable. For example, a removable hard drive may be used for persistent storage 210. Other examples include optical and magnetic disks, thumb drives, and smart cards that are inserted into a drive for transfer onto another computer-readable storage medium that is also part of persistent storage 210.

Communications unit 202, in these examples, provides for communications with other data processing systems or devices external to server sub-system 102. In these examples, communications unit 202 includes one or more network interface cards. Communications unit 202 may provide communications through the use of either or both physical and wireless communications links. Any software modules discussed herein may be downloaded to a persistent storage device (such as persistent storage device 210) through a communications unit (such as communications unit 202).

I/O interface set 206 allows for input and output of data with other devices that may be connected locally in data communication with server computer 200. For example, I/O interface set 206 provides a connection to external device set 214. External device set 214 will typically include devices such as a keyboard, keypad, a touch screen, and/or some other suitable input device. External device set 214 can also include portable computer-readable storage media such as, for example, thumb drives, portable optical or magnetic disks, and memory cards. Software and data used to practice embodiments of the present invention, for example, dataless history buffer program 300, can be stored on such portable computer-readable storage media. In these embodiments the relevant software may (or may not) be loaded, in whole or in part, onto persistent storage device 210 via I/O interface set 206. I/O interface set 206 also connects in data communication with display device 212.

Display device 212 provides a mechanism to display data to a user and may be, for example, a computer monitor or a smart phone display screen.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

II. Example Embodiment

Figure 2A:
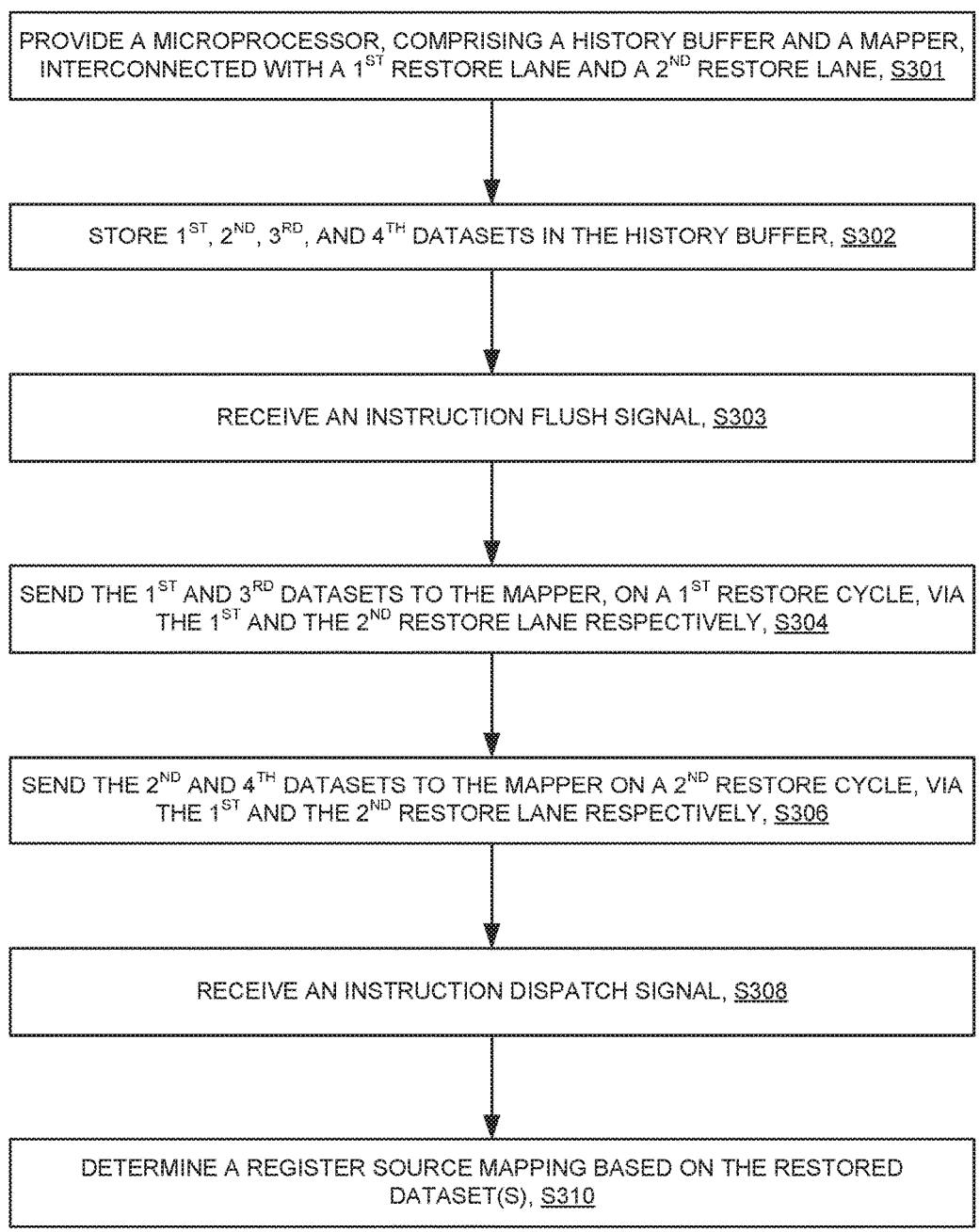
FIG. 2A is a flowchart showing a method performed, at least in part, in accordance with at least one embodiment of the present invention.
Figure 2B:
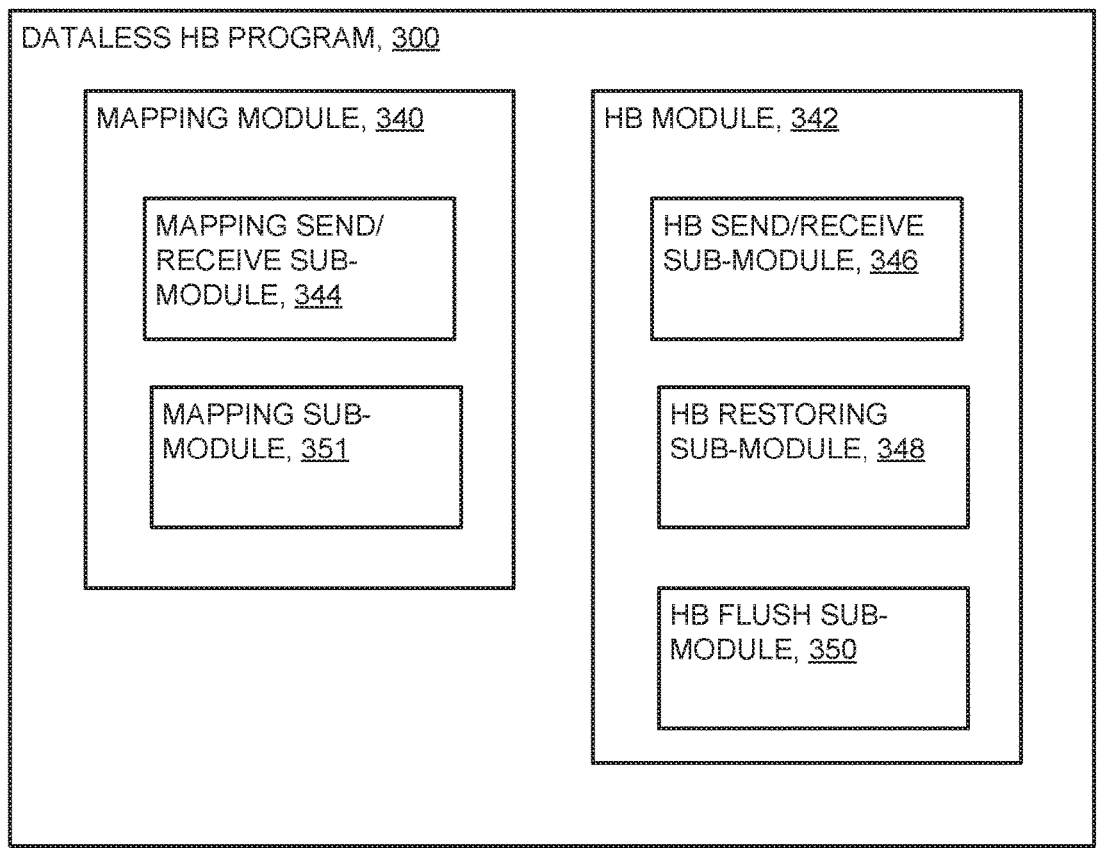
FIG. 2B is a is a block diagram showing a machine logic (for example, implemented in software or hardware) portion of a system in accordance with at least one embodiment of the present invention.
Figure 2C:
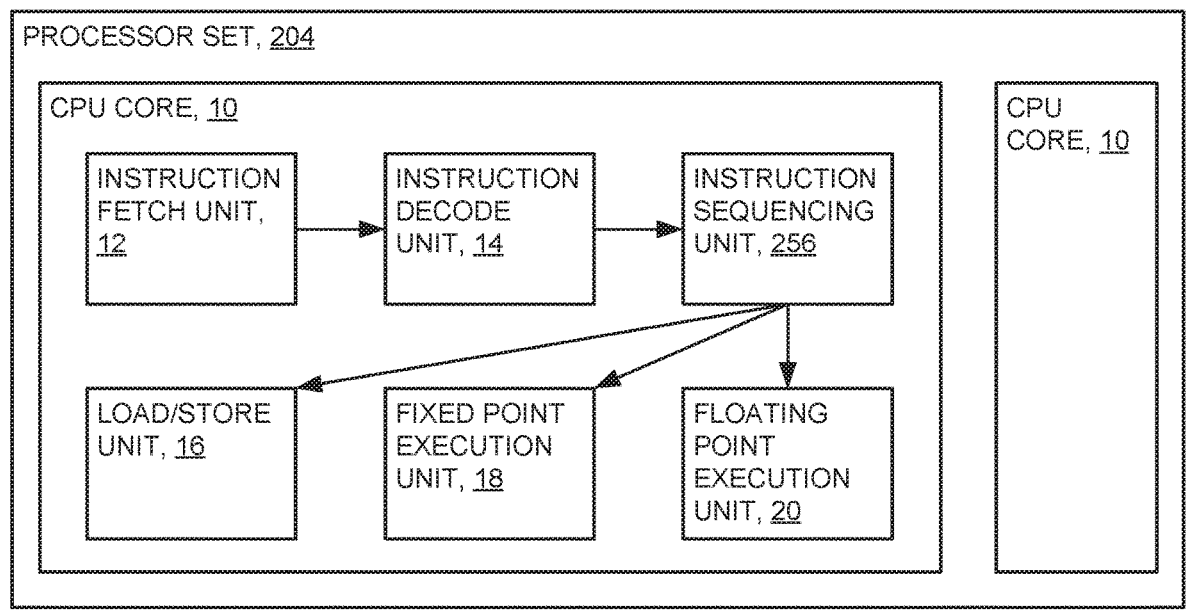
FIG. 2C is a functional block diagram showing a processor set in accordance with at least one embodiment of the present invention.
Figure 2D:
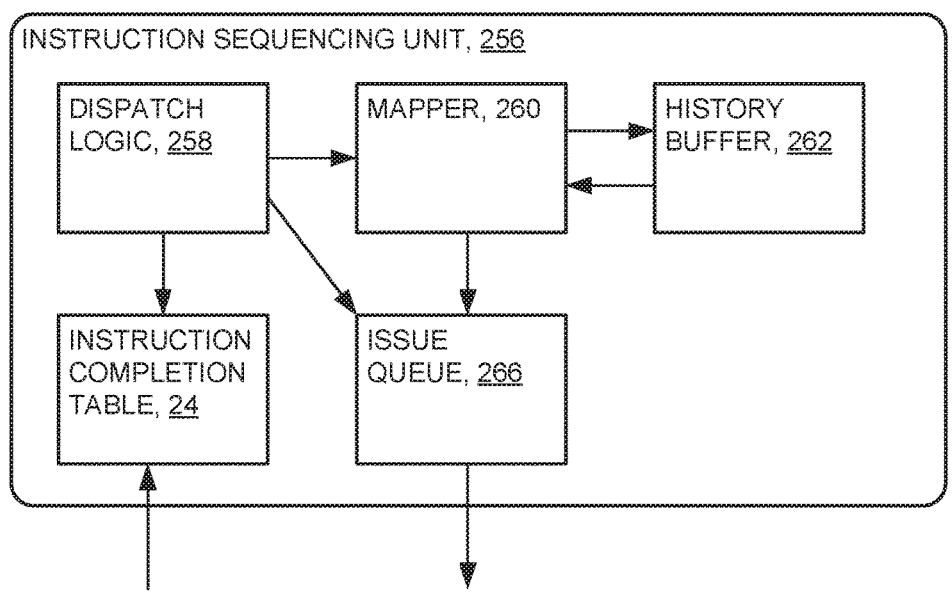
FIG. 2D is a functional block diagram showing an instruction sequencing unit in accordance with at least one embodiment of the present invention.

Discussion now turns to flowchart 250 of FIG. 2A which depicts a method according to the present invention. FIGS. 2B, 2C and 2D show hardware and/or software modules for performing at least some of the method operations of flowchart 250. This method and associated hardware and/or software will now be discussed, over the course of the following paragraphs, with extensive reference to FIG. 2A (for the method operation blocks) and FIGS. 2B, 2C, and 2D (for the hardware and/or software modules). In some embodiments of the present invention, the methods presented herein are implemented in software (for example microcode, firmware, or the like). In some embodiments, the methods are implemented in hardware (for example, physical circuits integrated into a microprocessor chip design). In some embodiments, the methods are implemented by a combination of software operatively working in conjunction with hardware in any combination.

Processing begins with operation S301 where server computer 200 comprises processor set 204 (FIG. 1). Processor set 204 comprises a processor having integrated thereon history buffer 262 and mapper 260 (FIG. 2D). The history buffer is a sub-system for recovering previous states of the processor as needed. The mapper is a sub-system for mapping a relationship between a logical register and a corresponding address in a physical memory module, where data associated with the logical register is stored. Data communications between the history buffer and the mapper is provided through a plurality of lanes and ports. For example, for data passing from the mapper to the history buffer, dispatch lane 220 (FIG. 4A) interconnects one or more output ports (not shown in the Figures) of the mapper with one or more respectively corresponding input ports (not shown in the Figures) of the history buffer. For data passing from the history buffer to the mapper, restore lane 222 (FIG. 4A) interconnects one or more output ports (not shown in the Figures) of the history buffer and one or more respectively corresponding input ports (not shown in the Figures) of the mapper. In some embodiments, the mapper has a port corresponding to each entry in the mapper (FIG. 3B, mapper 260, "mapper entries").

Figure 3A:
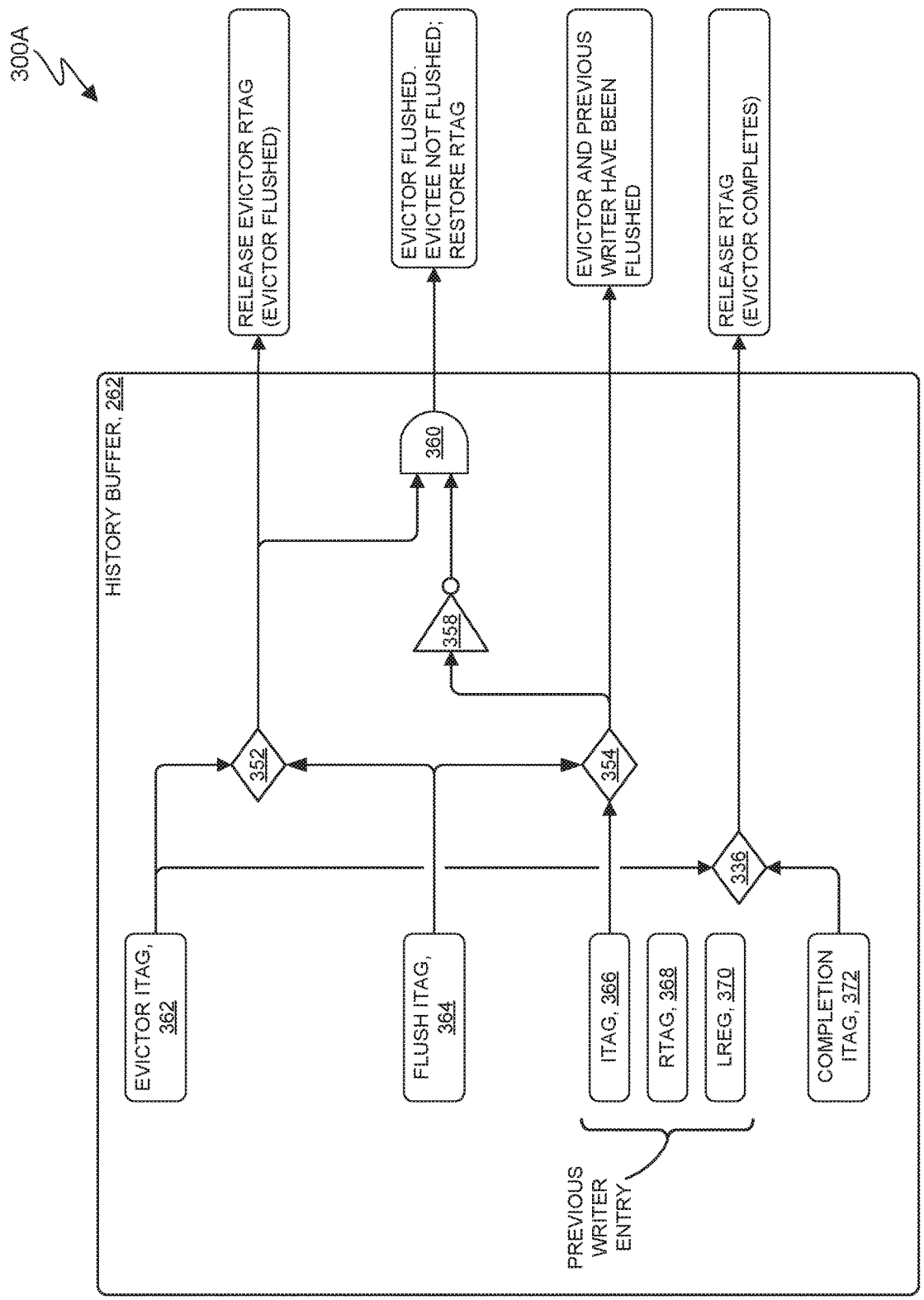
FIG. 3A is a history buffer logic diagram in accordance with at least one embodiment of the present invention.
Figure 3C:
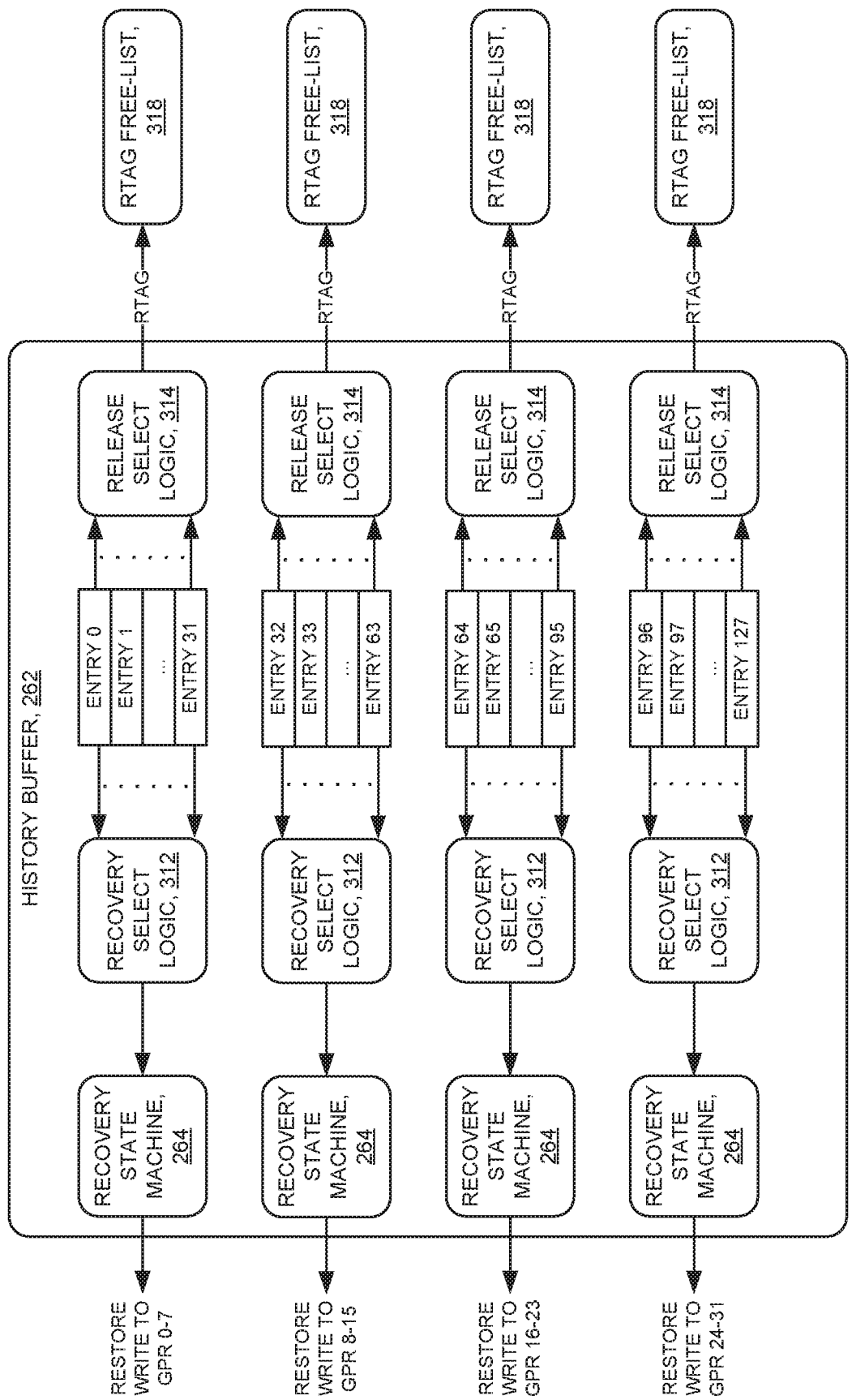
FIG. 3C is a functional block diagram showing a history buffer in accordance with at least one embodiment of the present invention.
Figure 4A:
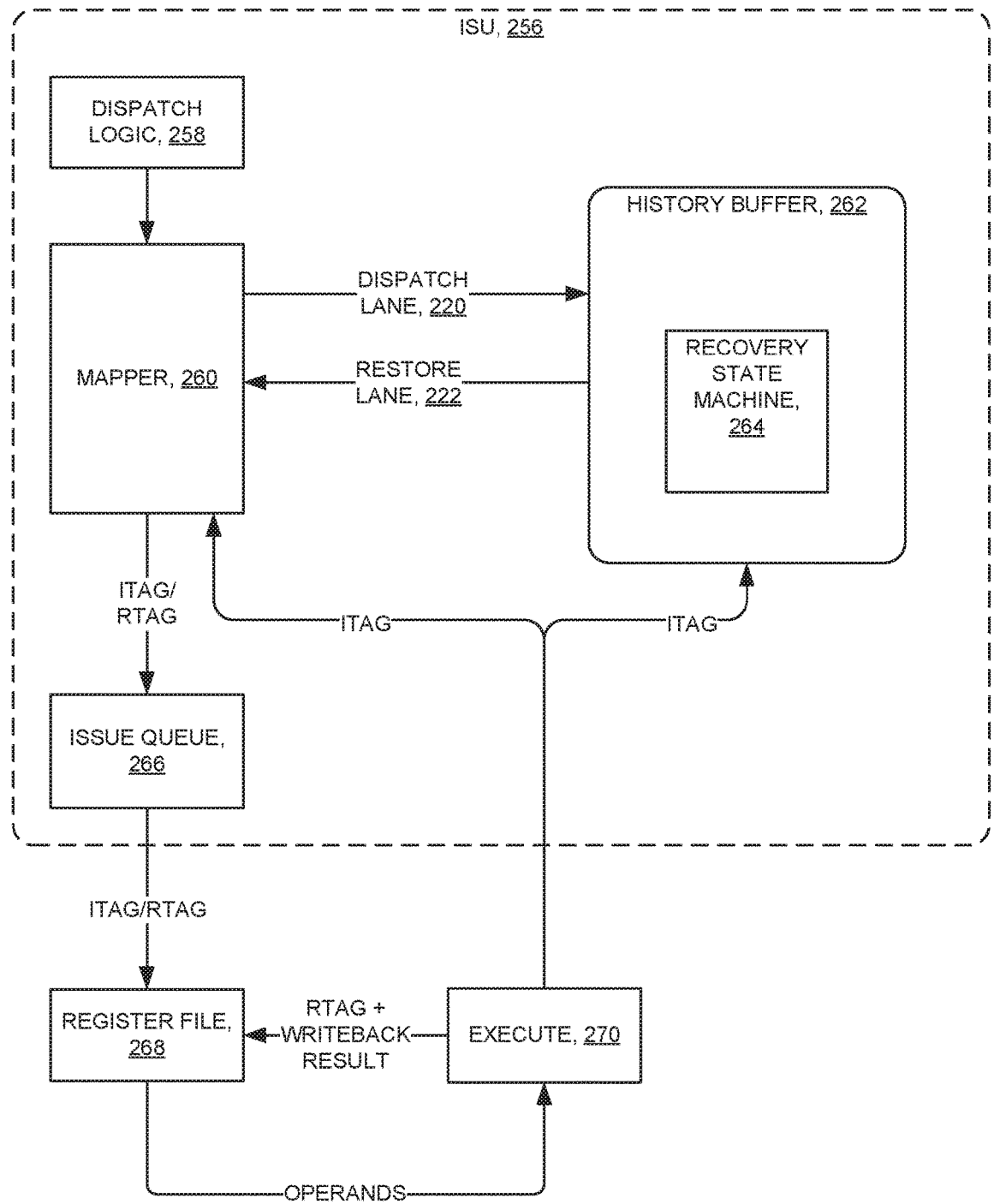
FIG. 4A is a functional block diagram showing a history buffer with register tag (RTAG) design in accordance with at least one embodiment of the present invention.

Processing proceeds at operation S302, where mapping send/receive sub-module 344, of mapping module 340, sends a plurality of datasets, including $1^{ST}$, $2^{ND}$, $3^{RD}$ and $4^{TH}$ datasets, to history buffer 262, via dispatch lane 220 (FIG. 4A). Each dataset is an entry (for example entry 0, entry 1, etc., of history buffer 262, of FIG. 3C). Further discussion of entries stored in history buffer 262 can be found below with respect to FIG. 4D.

History buffer send/receive sub-module 346 of history buffer module 342 receives the datasets, and stores the $1^{ST}$ and $2^{ND}$ datasets in history buffer 262 as entries 0 and 1 respectively (FIG. 3C). History buffer send/receive submodule 346 further stores the $3^{RD}$ and $4^{TH}$ datasets in history buffer 262 as entries 32 and 33 respectively (FIG. 3C). Entries 0 and 1 in the history buffer are included in range 1. Entries 32 and 33 are included in range 2. A more detailed discussion of the ranges is found below, with respect to FIG. 3C.

Processing proceeds at operation S303, where history buffer flush sub-module 350, of history buffer module 342, receives an instruction flush signal.

Figure 5:
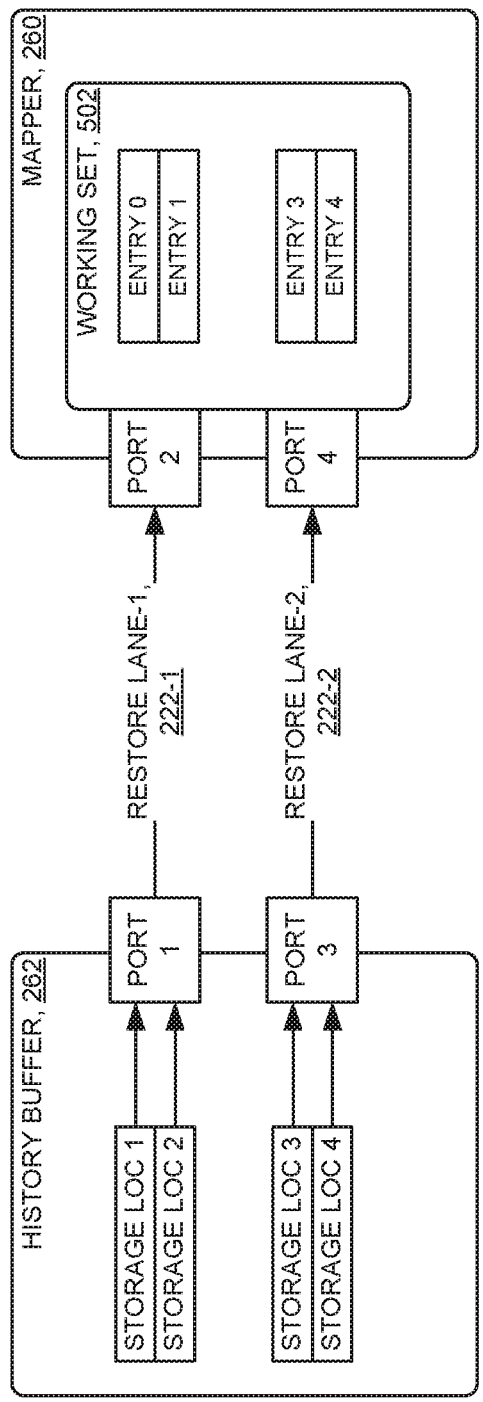
FIG. 5 is a block diagram showing restore lanes interconnecting a history buffer and a working set of a LRDG/RTAG mapper in accordance with at least one embodiment of the present invention.

Processing proceeds at operation S304 where, in response to receiving the instruction flush signal in operation S303 above, history buffer restoring sub-module 348, working in conjunction with history buffer send/receive sub-module 346, sends the $1^{ST}$ and $3^{RD}$ datasets to mapper 260, via restore lane 222-1 and restore lane 222-2 respectively (see FIG. 5).

Processing proceeds at operation S306, where, in further response to receiving the instruction flush signal in operation S303 above, history buffer restoring sub-module 348, working in conjunction with history buffer send/receive sub-module 346, sends the $2^{ND}$ and $4^{TH}$ datasets to mapper 260, via restore lane 222-1 and restore lane 222-2 respectively (see FIG. 5).

Processing proceeds at operation S308, where history buffer restoring sub-module 348 receives an instruction dispatch signal.

Processing proceeds at operation S310, where mapping sub-module 351 of, mapping module 340, in response to receiving the instruction dispatch signal in operation S308 above, determines a register source mapping, based on the datasets restored from the history buffer in operations 5304 and 5306 above.

(III) Further Comments and/or Embodiments

Some embodiments of the present invention apply the concept of banked write ports to a logical-register-to-register-tag mapper (an LREG/RTAG mapper, or simply, a mapper), which may include one, or more, of the following features, characteristics, and/or advantages: allows a large number of inexpensive restore ports (sometimes herein referred to as write ports, or "banked write ports") to be added to the mapper working set, at a lower cost than if the restore ports have to write to the entire regfile. For example, consider an embodiment that uses sixteen restore ports and has 64 registers. The 64 registers are organized into sixteen subsets of four registers each. Each restore port writes only to one of the sixteen subsets, and thereby, in four restore cycles or fewer, all 64 registers can be restored. Note that the terms "write port", "restore lane" and "restore port" as used herein, are synonymous, unless indicated otherwise.

Turning now to FIG. 2C, which is a functional block diagram depicting, at a high abstraction level, some components of processor set 204 (FIG. 1). Processor set 204 includes: a plurality of central processing unit cores (CPU core 10), and at least one each of: instruction fetch unit (IFU 12); instruction decode unit (IDU 14); load/store unit (LSU 16); fixed point execution unit (FXU 18); floating point execution unit (FPU 20); and instruction sequencing unit (ISU 256).

IFU 12 fetches an instruction from memory for execution. IDU 14 decodes the instruction provided by the IFU and sends information pertaining to the instruction to ISU 256.

ISU 256 accepts the instruction from IDU 14, in program order, and schedules execution of the instructions, taking into account resolution of any dependencies that may exist among the instructions. The ISU enables instructions to execute out-of-order while maintaining integrity of the data, read and/or and written by the instructions, with respect to the dependencies.

Load/store unit (LSU 16) fetches data from memory and writes to architected registers sometimes herein referred to as general purpose registers (GPRs). Architected registers may also include vector-scalar registers (VSRs) as well. Fixed point unit (FXU 18) executes fixed point instructions. Floating point execution unit (FPU 20) executes floating point instructions.

FIG. 2D is a functional block diagram showing, at a high abstraction level, ISU 256. ISU 256 includes: instruction completion table (ICT 24); dispatch logic 258, logical register/register tag mapper (mapper 260, also sometimes herein referred to as LREG/RTAG mapper); history buffer 262; and issue queue 266.

Dispatch logic 258 accepts instructions from IDU 14, and dispatches the instructions to mapper 260 and issue queue 266. The dispatch logic manages the rate that new instructions are accepted from the IDU to avoid overrunning the issue queue or the history buffer 262.

Mapper 260 maintains associations (maps) between logical registers (LREG) indicated by the program instructions and respectively corresponding physical registers (RTAGs) for reference in register file 268 (FIG. 4A). In some embodiments of the present invention, the mapper holds only the most recent physical mapping of the given logical register (LREG).

History buffer 262 holds RTAG mappings of the various LREGs which are not the most recent, but have not yet completed and may need to be restored, for example, due to a flush.

Issue queue 266 receives and retains information from dispatch logic 258 and mapper 260 and schedules issuance of instructions to the execution units. Once previous writer(s) (source dependencies) have written data to the register file and all dependencies are resolved (registers ready) with respect to an instruction, the issue queue issues the instruction to the appropriate execution unit (for example to FXU 18 and/or to FPU 20) for processing.

Instruction completion table (ICT 24) manages instructions from dispatch to completion. When dispatch logic 258 dispatches an instruction to an execution unit (for example, to the FXU and/or to the FPU), the dispatch logic sends to the instruction completion table (ICT) information that is necessary for completion of the instruction. If the execution of the instruction finishes with no problems, the execution unit notifies the ICT that it the instruction has finished and can now complete. If the execution unit detects a problem, it signals the problem (at least to the ICT) and triggers a flush of the instruction. Each dispatched instruction is assigned an instruction tag (ITAG). The ITAG is used to write into the instruction completion table (ICT 24) and is passed to mapper 260 and issue queue 266 for handling of the instruction.

FIGS. 2C and 2D show a basic core (CPU core 10). Some embodiments of the present invention have multiple slices wherein there is a separate copy of mapper 260 and issue queue 266 associated with each slice. In some embodiments, there is a separate history buffer 262 associated with each slice. Some embodiments have a single history buffer which services multiple slices. For simplicity, the foregoing description with respect to FIG. 2D reflects a single slice. Those skilled in the relevant arts will recognize that the description herein is extensible to embodiments having multiple slices.

Logic diagram 300A of FIG. 3A shows some flush logic functions associated with a history buffer entry in accordance with some embodiments of the present invention. Logic diagram 300A includes the following items: comparison blocks 352, 354, and 356; logical NOT block 358 (logical inverter); logical AND block 360; evictor instruction tag (evictor ITAG 362); flush ITAG 364; ITAG 366; RTAG 368; LREG 370, and completion ITAG 372. Outputs of the comparison blocks (352, 354, and 336) are defined as follows: (i) in the case of comparison block 352, a TRUE result means flush ITAG 364 is older than evictor ITAG 362 (meaning the evictor ITAG is flushed), while a FALSE result means the flush ITAG is not older than the evictor ITAG; (ii) in the case of comparison block 354, a TRUE result means flush ITAG 364 is older than ITAG 366 of a previous writer (meaning ITAG 366 is flushed), while a FALSE result means the flush ITAG is not older than the ITAG; and (iii) in the case of comparison block 336, a TRUE result means completion ITAG 372 is younger than evictor ITAG 362, while a FALSE result means the completion ITAG is not younger than the evictor ITAG. The output of logical NOT block 358 is TRUE if the input is FALSE and vice versa. Note that evictor ITAG 362 is associated with an evictor while ITAG 366, RTAG 368, and LREG 370 are all associated with a previous writer (an evictee) which is evicted by the evictor.

History buffer 262 compares flush ITAG 364 against both evictor ITAG 362 and previous writer ITAG 366. If the flush ITAG is older than the evictor ITAG (comparison 352 result="TRUE"), RTAG release logic 314 (FIG. 3C), of history buffer 262, releases the evictor RTAG to the RTAG free-list 318 (FIG. 3C).

If flush ITAG 364 also is older than the previous writer ITAG 366 (comparison 354 result="TRUE"), this means both the evictor and the previous writer have been flushed.

If comparison 352 result="TRUE" and the previous writer ITAG 366 is older than flush ITAG 364 (comparison 354 result="FALSE", the result is subsequently inverted to "TRUE" by logical NOT 358, and consequently logical AND 360 result="TRUE"), then: (i) the evictor is flushed; (ii) the previous writer (evictee) is not flushed; and (iii) the history buffer restores the previous writer entry (including ITAG 366, RTAG 368, and LREG 370) back to the mapper at the location pointed to by LREG 370.

When the flush logic requests to restore an entry (logical AND 360 result="TRUE"), the recovery select logic 312 (FIG. 3C) selects a corresponding entry, (one entry per restore cycle per recovery state machine (also sometimes herein referred to as a restore state machine)) to send to a corresponding recovery state machine 264 (FIG. 3C). The recovery state machine sends the entry to the mapper.

When a flush concurrently hits several instructions (which causes a number of concurrent restore requests), each range (for example range 1 and range 2, FIG. 3B) has its own path (for example 222-1 and 222-2 respectively, FIG. 3B), also sometimes herein referred to as a communication channel. In the embodiment of FIG. 3C, history buffer 262 has four ranges (entries 0-31, entries 32-63, entries 64-95, and entries 96-127). In this embodiment, it takes no more than eight cycles to restore from flush all 32 registers (GPR 0-31). One example sequence out of a great number of possible restore cycle sequences is as follows: cycle 1—restore to GPRs 0, 8, 16, and 24 respectively from entries 0, 32, 64, and 96; cycle 2—restore to GPRs 1, 9, 17, and 25 respectively from entries 1, 33, 65, and 97; cycles 3 through 8 continue in like fashion, concluding with cycle 8—restore to GPRs 7, 15, 23, and 31 from entries 7, 39, 71, and 103. Note that in the embodiment of FIG. 3C, each history buffer entry (for example ENTRY 0, ENTRY 1, etc.) is associated with a single recovery state machine 264. In some embodiments of the present invention however, each history buffer entry is associated with more than one recovery state machine, and may be able to interact with all of the recovery state machines. In some embodiments, each recovery state machine 264 targets a particular LREG range (for example GPR 0-7, GPR 8-15, etc. , see FIG. 3B).

Flush bandwidth increases in proportion to the number of ranges in the history buffer. As an example, in an embodiment with 32 registers associated with eight ranges, the 32 registers (GPR 0-31) may be restored in four cycles (one register per range per cycle means eight registers per cycle, and all 32 registers can be restored over four cycles). This does not impact the write ports into mapper 260. Each range has a write path (for instance 222-1 and 222-2, FIG. 3B) into the subset of mapper entries (for instance subset 1 and subset 2, FIG. 3B) for which it is designed.

If, on the same flush, logical AND 360 result="TRUE" because comparison 352 result="TRUE" (evictor ITAG 362 is flushed), AND comparison 354 result="FALSE" (ITAG 366 is not flushed), history buffer 262 restores RTAG 368 to the respective LREG 370 location within the mapper. Note: logical AND block 360 result is "TRUE" when comparison 352 result is "TRUE" and comparison 354 result is "FALSE" (logical NOT block 358 inverts the comparison 354 result from "FALSE" to "TRUE").

If evictor ITAG 362 is older than completion ITAG 372, (comparison 336 result="TRUE"), RTAG release logic 314 releases RTAG 368 to RTAG free-list 318 (FIG. 3C) and history buffer 262 releases the previous entry (the evictor is done).

FIG. 3B depicts selected detail of mapper 260 in accordance with some embodiments of the present invention. In the embodiment of FIG. 3B, mapper 260 has 32 general purpose registers (GPR 0-GPR 31). Some embodiments of the present invention may hold different numbers of registers, different types of registers (such as vector-scalar registers (VSRs)) or multiple threads worth of registers. Source multiplexer 322 corresponds to a single source lookup from dispatch. An instruction may specify none, one, or multiple source registers, and may generally specify a single target register, although some instructions may not write to a register at all (that is to say, they do not specify a target register). Each source of each dispatch instruction has one source multiplexer 322.

Evictor multiplexer 324 shows the reads from mapper 260 contents to evict a previous writer of a given register. Each dispatched instruction has its own evictor multiplexer 324 (in other words, there is one evictor multiplexer for each dispatched instruction). FIG. 3B1 is an expanded detail showing the write ports going to a mapper entry (GPR N). In some embodiments, there is one write port (dispatch WRT 0-dispatch WRT N) for each dispatched instruction, and a write port for the restore (restore write). Some embodiments have a single write port for a given mapper entry, for all restore activity. The contents of the mapper comprise: the ITAG writing the register; and the RTAG being used.

Discussion now turns to FIG. 3C which shows a history buffer 262 logic, at a high level of abstraction, in accordance with some embodiments of the present invention. In the embodiment of FIG. 3C, history buffer 262 has four ranges (also herein referred to as slices) of 32 entries each, as follows: first range includes entries 0-31; second range includes entries 32-63; third range includes entries 64-95; and fourth range includes entries 96-127. In some embodiments, the history buffer may have any number of entries in a range (slice), and the history buffer may have any number of ranges. In some embodiments of the present invention, entries may span multiple ranges (that is, they may be able to send requests to any restore write path).

Write-steering logic (not shown in the Figures) is specific to the organization of entries with respect to restore paths. In some embodiments, write-steering logic accepts one input from mapper 260 for each instruction dispatched. The write-steering logic decodes the logical register (LREG). Based on the decoded LREG, the write-steering logic writes the entry within a particular range of the history buffer. The steering logic routes the entry to a range corresponding to where that range will later be writing (upon recovery from the history buffer). For example, the write steering logic writes an entry, that will later be restored to GPR 0-7, in the first range (0-31). Write steering logic writes an entry that will later be restored to GPR 8-15 in the second range (32-63), and so on. Some embodiments allow history buffer entries to restore to multiple restore paths, in which case write-steering logic may not be necessary. Whereas associating history buffer entries with specific restore paths may allow for simpler wiring, allowing entries to access multiple restore paths may reduce the total number of entries.

Some embodiments of the present invention may recognize one, or more, of the following facts, potential problems, and/or potential areas for improvement with respect to the current state of the art: (i) in some conventional history buffer designs, result data (output from a program instruction) is kept in the history buffer along with associated control logic; (ii) at dispatch time, the dispatching instructions read the source operands (input data for a program instruction) from a register file, and store the operands in a reservation station; (iii) previous data in the register file is also read out, using the destination field of a dispatching instruction, and stored in the history buffer; (iv) the history buffer snoops the result busses at write back time to write in result data if the destination field has not had a chance to be written back; and (v) this design results in large silicon usage and power consumption associated with the reservation station and the write back ports in the history buffer.

Some embodiments of the present invention introduce a data-less history buffer design. The history buffer comprises control logic and associated pointers which point to registers holding operand data, and may not need to receive any data from the execution units (that is snoop write-back busses).

An instruction typically includes source and target operands (input and output, respectively). In some embodiments of the present invention, a source operand equates to a source lookup. A target operand equates to where the instruction writes the output. A target operand generates an eviction from the LREG/RTAG mapper where a source operand reads from the mapper. In other words, a source operand provides data (or a pointer to the data) that the instruction needs to perform its function. A target operand is the location where the result of the instruction is to be stored. For example, suppose an instruction is to read the values stored in registers A and B, compute the sum of the values, and write the arithmetic sum in register C. Registers A and B (or pointers to registers A and B) comprise the source operands, and register C (or a pointer to register C) comprises the target operand.

The following discussion gives an example program instruction carried out in accordance with some embodiments of the present invention, and makes extensive reference to FIGS. 2C and 2D. The example instruction (expressed in assembler language) is ADD R3,R2,R4 meaning the value stored in register 2 (R2) is to be added to the value stored in register 4 (R4) and the resulting sum is to be written to register 3 (R3). (R3=R2+R4). R2, R3 and R4 are general purpose registers (sometimes herein referred to as GPR2, GPR3, and GPR4 respectively).

Processing begins where CPU core 10, of processor set 204, triggers a program instruction for execution. The instruction is assigned an instruction tag (ITAG) for identification and tracking. The instruction (expressed in assembly language) is ADD R3,R2,R4. Instruction fetch unit (IFU 12), of CPU core 10, fetches the instruction and delivers it to instruction decode unit (IDU 14) of the CPU core.

IDU 14 decodes the instruction and generates (and sends to the instruction sequencing unit (ISU 256)) any signals necessary for issue (such as routing, source locations and target destinations). In response, dispatch logic 258 sends a source read request for GPR2 and GPR4 to mapper 260. The dispatch logic sends target indication of GPR3 to the mapper. The dispatch logic further indicates to issue queue 266: (i) that the instruction will be issued to the fixed point execution unit (FXU 18); and/or (ii) any other information needed by ISU 256 in carrying out the instruction.

LREG/RTAG mapper (mapper 260) performs the following actions: (i) reads out the physical locations (RTAGs) where the GPR2 and GPR4 values can be found and passes the RTAGs to issue queue 266; (ii) reads the old GPR3 information (associated with a previous instruction) before evicting it in favor of GPR3 information associated with the current instruction; (iii) sends the old GPR3 information to history buffer 262; and (iv) performs a register re-naming, by writing a new RTAG value (selected from RTAG free-list 318 (FIGS. 3C and 4B)) to GPR3 location mapper 260 to designate the location of GPR3 that is to receive the result of the instruction.

History buffer 262 decodes the LREG=GPR3 (meaning it associates the logical register address with the RTAG (GPR3)) and writes to a history buffer entry within a range that can handle the GPR3 LREG (FIG. 3C, entry 0-entry 127). The history buffer holds this information until the instruction is either completed or flushed.

Once any dependencies are resolved, issue queue 266 issues the instruction to the fixed point execution unit (FXU 18). The issue queue sends the RTAGs, provided by the mapper, for the two source operands (GPR2 and GPR4) to the FXU. The issue queue sends the target RTAG to the FXU, to indicate where the result should be written (GPR3).

FXU 18 performs the following actions to process the instruction: (i) reads the two sources (the values associated with GPR2 and GPR4) from respective registers based on the RTAGs provided by mapper 260; (ii) adds the two values together to determine a resultant sum; (iii) writes the resultant sum into the register file in the location based on the target RTAG associated with GPR3 provided by issue queue 266; and (iv) finishes the instruction (meaning the FXU sends a completion message to the instruction completion table (ICT 24), of ISU 256). If a problem occurs with execution of the instruction, the completion message indicates the existence and nature of the problem. ICT 24 receives the completion message, including any error information, from FXU 18.

If the instruction completes normally, processing proceeds where ICT 24 performs cleanup activities. The execution unit (in the present example, FXU 18) passes the ITAG associated with the instruction (now considered to be a "completion ITAG") to history buffer 262, with an indication to complete the instruction (that is, perform any necessary cleanup). The history buffer compares the completion ITAG with an evictor ITAG in all entries. Any entry which was completed releases its previous RTAG and the entry is released.

If the instruction does not complete normally, processing proceeds where ICT 24 cannot complete the instruction and instead sends the ITAG associated with the instruction (now referred to as a "flush ITAG") to history buffer 262, to signal that the instruction associated with the flush ITAG must be flushed. In some embodiments, if the instruction cannot be completed, the execution unit (in this example, FXU 18), rather than ICT 24, directly signals the need for a flush. Examples of reasons why an instruction cannot be completed include: (i) an instruction is started based on a branch prediction where the prediction turns out to be wrong; (ii) the processor state changes causing subsequent fetches to become invalid; and/or (iii) storage-based conditions that prevent completion of the instruction.

FIG. 4A shows a history buffer design with register tag (RTAG) in accordance with some embodiments of the present invention. Some embodiments include: dispatch lane 220; and restore lane 222; instruction sequencing unit (ISU 256); dispatch logic 258; logical register/register tag mapper (mapper 260, sometimes herein referred to as LREG/RTAG mapper); recovery state machine 264; issue queue 266; register file 268; execute unit 270.

Data communicated on dispatch lane 220 (from mapper 260 to history buffer 262) includes an instruction tag (ITAG) and associated register tags (RTAG(s)), to store a machine state for later recovery. Data communicated on restore lane 222 (from history buffer 262 to mapper 260) includes an ITAG/RTAG pair associated with restoration of a previous state. Dispatch lane 220 and restore lane 222 each comprises a plurality of individual communication channels (also sometimes herein referred to as paths).

Some embodiments of the present invention improve program execution speed. The history buffer is subdivided based on the type (for example, general purpose register, scalar or vector) of the destination register that is mapped to by the mapper in the event of a restore).

Register mapping uses the history buffer design to keep track of machine states which may need to be restored. Register file 268 is placed outside of the instruction sequencing unit, ISU 206. History buffer 262 reads register file 268 after dispatch logic 258 dispatches, an instruction. The ISU keeps track of instructions in flight as follows: (i) mapper 260 gains (refers to) RTAG free-list 318 (FIG. 3C) to assign available RTAG(s) for new targets at dispatch time; (ii) the RTAG free-list acts as either a single pool of available RTAGs to service two super-slices or as two free-lists where each free-list represents an independent pool of available RTAGs to support the writes for a corresponding super-slice. The two free-list approach allows for fewer write-ports in register file 268, as a given entry can only be written by two slices. A free-list keeps track of available register tags (register tags that are currently unused and available for assignment to a program instruction). An RTAG that is allocated at dispatch time is considered as "in use" until a logical resource that it is renamed to has been replaced with something else. At that time it is sent back to the RTAG free-list.

There may be a finite number of RTAGs that are available in a given system. In some embodiments, there are a total of 128 available RTAGs. In some embodiments, there are a total of 256 RTAGs. The number of available RTAGs may be determined, in a given embodiment, based upon how large a pool of resources a designer wants to provide for. In some embodiments, the number of available RTAGs is embedded in the physical design of a microprocessor chip. In some embodiments, the RTAGs are implemented in software, and the number of such RTAGs is determined based on how large a memory range is allocated for such usage. Similarly, there is a finite number of ITAGs in some embodiments. As in the case of RTAGs, ITAGs may be implemented in hardware or software, and the number of ITAGs is a matter of the physical design of the microprocessor chip and/or the amount of memory allocated for usage as ITAGs. The number of ITAGs provided determines the number of instructions that a CPU (or a CPU core) is able to track, from dispatch to completion, at any given time.

An external structure (not separately shown in the Figures) tracks writebacks by reference to respectively corresponding ITAGs. An ITAG is an instruction tag, which tracks instructions in flight. An ITAG indicates (sets) an RTAG_V (register tag validity bit) at issue time if a corresponding entry in register file 268 has seen a writeback and consequently contains valid data. An RTAG_V that is set (RTAG_V=1) indicates that resultant data located in the register file, pointed to by a corresponding RTAG, is valid data.

With respect to an instruction in flight, the RTAG_V bit indicates to the ITAG that a potential dependency exists on the mapper. The active ITAG target determines whether there is in fact, an actual a dependency. Consequently, it is not necessary to communicate the dependency between the mapper and the history buffer.

Figure 4B:
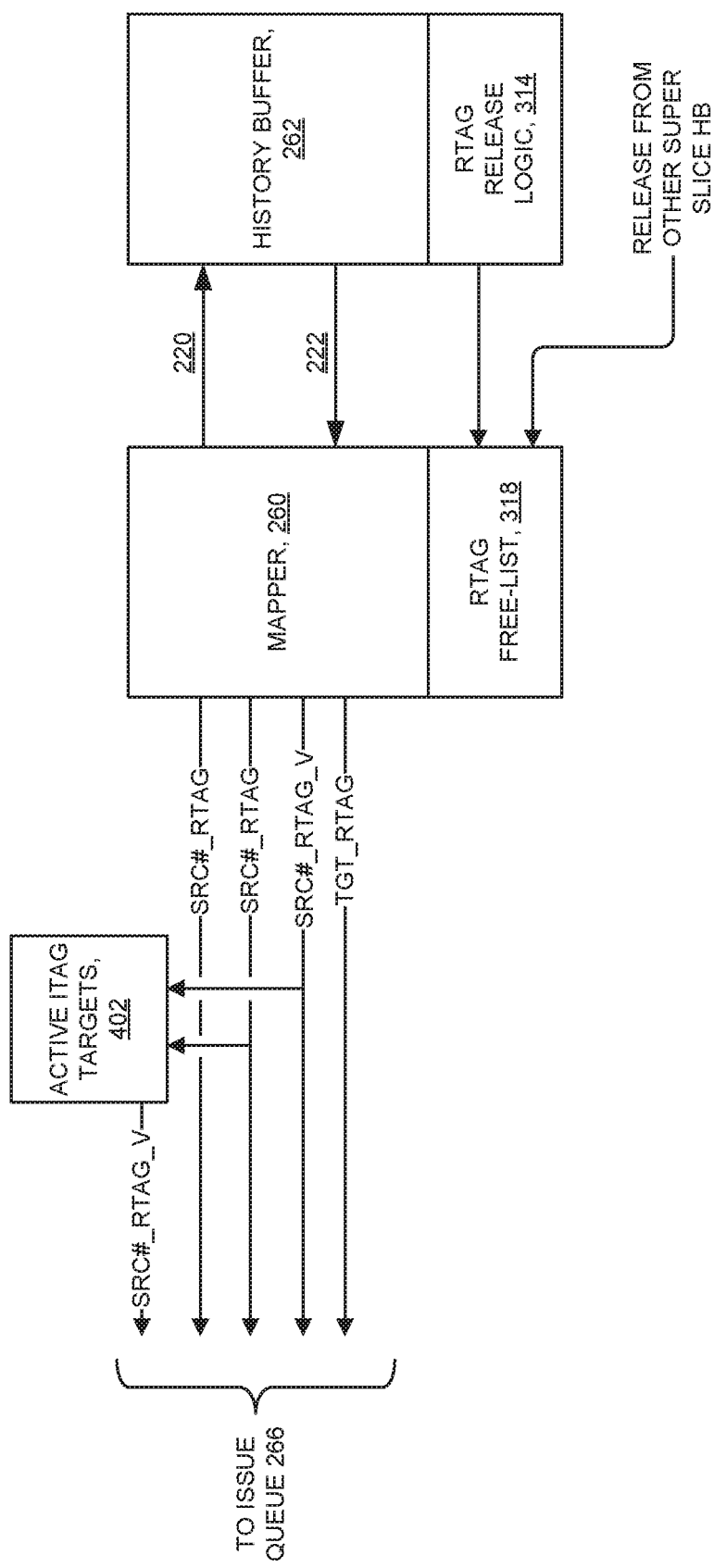
FIG. 4B is a functional block diagram showing a logical register/register tag (LREG/RTAG) mapper/history buffer structure in accordance with at least one embodiment of the present invention.

FIG. 4B shows a high level mapper/history buffer structure in accordance with at least one embodiment of the present invention. The mapper/history buffer structure includes: history buffer 262; RTAG release logic 314; mapper 260; RTAG free-list 318; and active ITAG targets 402.

In some embodiments of the present invention, active ITAG targets 402 maintains a bit that corresponds to each outstanding instruction in flight. Each entry in active ITAG targets 402 is based on an ITAG and assigned a corresponding register tag (RTAG). When dispatch logic 258 (FIG. 4A) dispatches an instruction: (i) mapper 260 issues an RTAG and assigns the RTAG to the instruction; and (ii) active ITAG targets 402: (a) looks at a corresponding RTAG_V to determine whether or not the register pointed to by the RTAG is valid; and (b) indicates to issue queue 266 (FIG. 4A) whether there is a dependency associated with the register. Mapper 260 acts as a lookup table, and the RTAG acts as a pointer. The operand data is stored separately from the mapper, and the history buffer. However, the mapper mimics the data but indicates whether corresponding writeback data has been written.

Figure 4C:
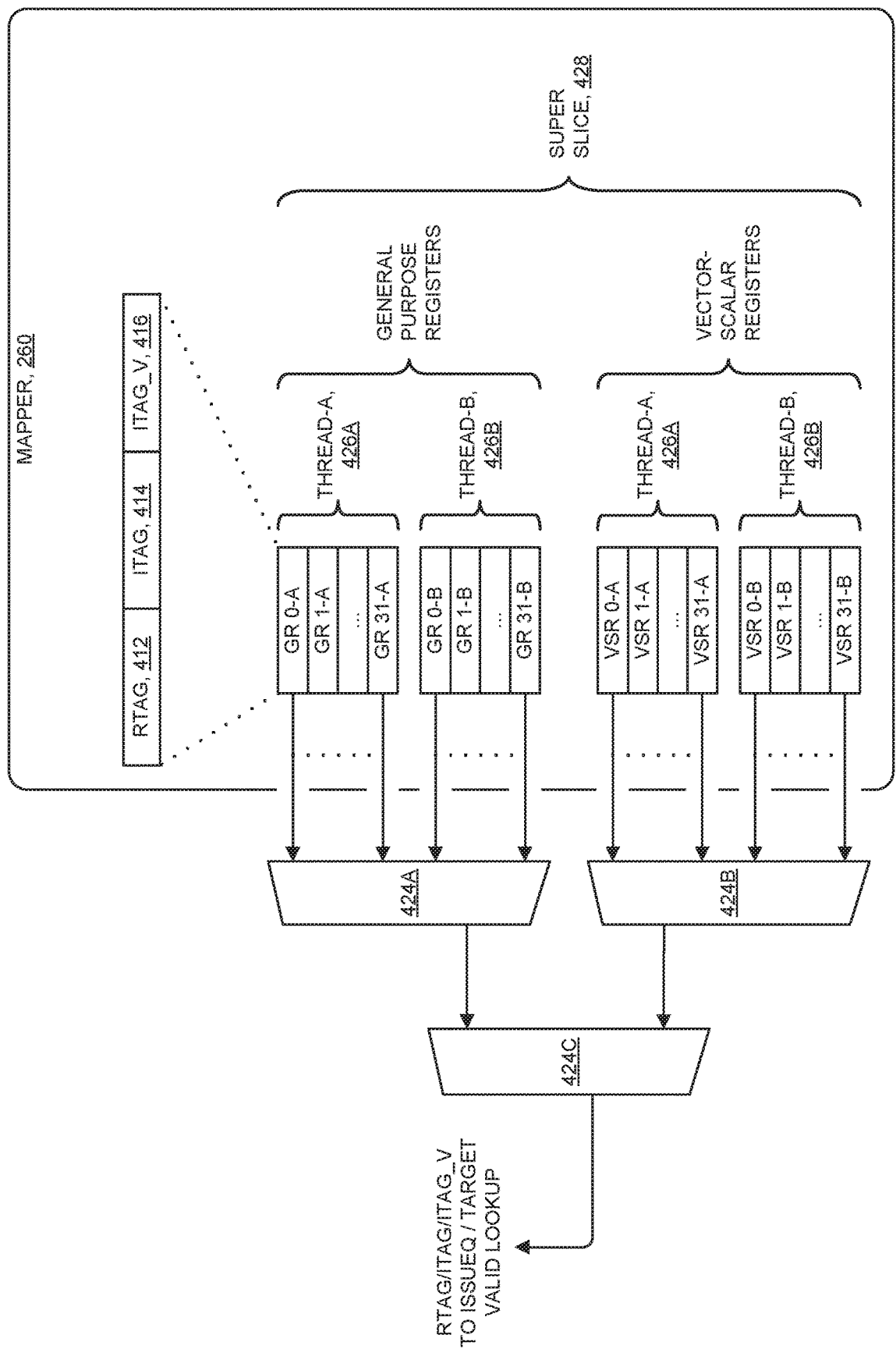
FIG. 4C is a functional block diagram showing a logical register/register tag (LREG/RTAG) mapper in accordance with at least one embodiment of the present invention.

FIG. 4C is a block diagram showing a mapper 260 in accordance with at least one embodiment of the present invention. When dispatch logic 258 (FIG. 4A) dispatches a program instruction, mapper 260 multiplexes out the contents of a corresponding source register (for example (general purpose register 0) GR0 of thread-A 426A) associated with the instruction, as that particular entry, and provides the entry on to the next level (issue queue 266) for execution. In some embodiments of the present invention, contents of the source register includes the following information: a register tag (RTAG 412); an instruction tag (ITAG 414); and an instruction tag validity bit (ITAG_V 416).

The embodiment of FIG. 4C depicts super-slice 428 comprising two threads worth of information. Multiplexer 424A handles GR entries. Multiplexer 424B handles VSR entries. Multiplexer 424C further multiplexes outputs from multiplexers 424A and 424B down to the final source and presents the final source to issue queue 266. Some embodiments have a second super-slice which is a duplicate of the first super-slice. Some embodiments have any number of additional super-slices. A magnitude compare operation clears the ITAG_V when the corresponding instruction completes. Mapper 260 holds a single RTAG value for 32-bit general purpose registers, 64-bit vector-scalar registers (VSRs) and 128-bit VSRs. In some embodiments of the present invention, 64-bit and 128-bit registers are treated equally.

Some embodiments of the present invention write, into mapper 260, up to six new targets in a cycle at dispatch time. Previous values are bumped out to history buffer 262. A flush restore operation performs up to eight writes per cycle. Alternatively, some embodiments allow for more than six new targets that can be written per cycle at dispatch time, as well as more than eight writes that can be performed per cycle during a flush restore operation.

Figure 4D:
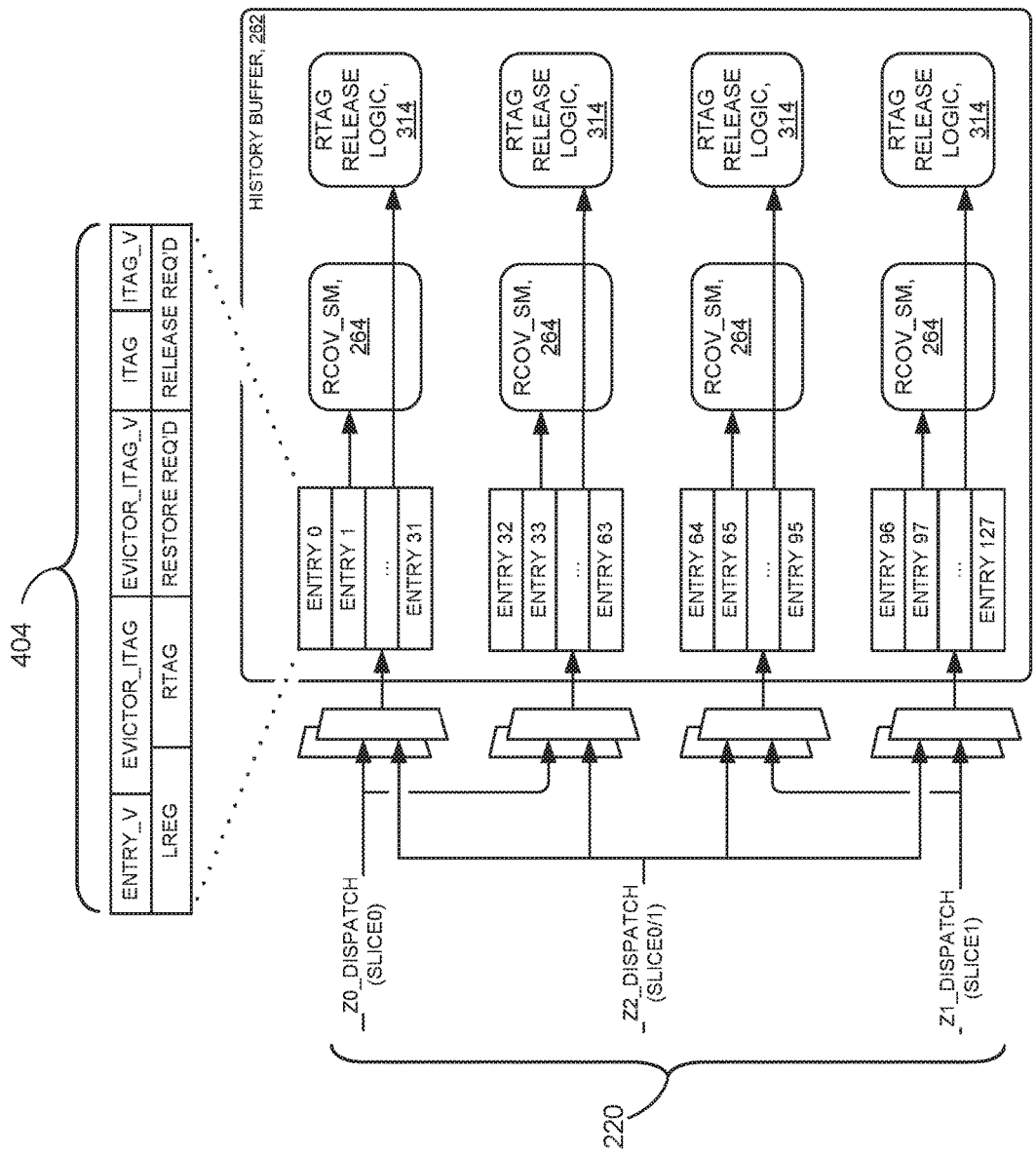
FIG. 4D is a block diagram showing a history buffer in accordance with at least one embodiment of the present invention.

FIG. 4D is a block diagram showing selected aspects of history buffer 262, in accordance with some embodiments of the present invention. The history buffer is organized into two lanes per slice. The history buffer includes multiple entries as well as flush restore state machines (RCOV_SM 264) and RTAG release logics (RTAG release logic 314). In the embodiment of FIG. 4D, the history buffer has 128 entries (entry 0 through entry 127) in four slices (slice (i) through slice (iv)) as follows: (i) entries 0-31; (ii) entries 32-63; (iii) entries 64-95; and (iv) entries 96-127. Some embodiments write the two lanes per slice in a ping-pong fashion (alternating writes between the lanes), unless one lane is empty. In some embodiments, history buffer 262 may have any number of entries per slice and any number of slices.

History buffer 262 comprises an entry for each instruction in its purview. When mapper 260 dispatches new data to an entry to the history buffer (for example via path Z0_DISPATCH (SLICE0)), any data existing in the entry is replaced by the new data.

Data in each entry in history buffer 262 comprises fields as shown in history buffer data 404. That is, an entry in history buffer 262, for example, entry 0, comprises the following fields: ENTRY_V (entry validity bit); EVICTOR_TAG; EVITOR_TAG_V (evictor tag validity bit); ITAG; ITAG_V; LREG; RTAG; RESTORE REQ'D (restore required bit); and RELEASE REQ'D (release required bit).

In some embodiments of the present invention, total flush restore bandwidth goes to eight restores per cycle between both super-slices. (one restore per lane). One flush restore requires 19 bits plus the number of bits in the RTAG (19+RTAG_width). Total RTAG release from history buffer 262 is four per super-slice (or eight RTAG releases distributed between two super-slices, one release per lane).

FIG. 5 is a block diagram showing restore lanes interconnecting history buffer 262 and mapper 260 in accordance with some embodiments of the present invention. Datasets from a subset of storage locations of history buffer 262 are transmitted via each restore lane. For example, datasets stored in storage loc 1 and storage loc 2 may only be restored to the mapper working set via restore lane 1. Similarly, datasets stored in storage loc 3 and storage loc 4 may only be restored via restore lane 2. In some embodiments, there are a great many storage locs in the history buffer, organized into any number of subsets. For each subset, there is a corresponding restore lane.

Active Itag Targets

In some embodiments of the present invention, active ITAG targets 402 (FIG. 4B) indicates, to issue queue 266, that a given dependency is valid. One bit per entry in an instruction completion table (ICT depth) indicates the corresponding ITAG is waiting for data to be written. In some embodiments, a single writeback, coming back for a given ITAG, is used only for clearing the dependency. At dispatch time, if the given instruction has a valid target, active ITAG targets 402 sets the RTAG_V bit (a one-bit array corresponding to the entry) to '1' (a Boolean "true" value). There may be up to six writes for this. At writeback time, active ITAG targets 402 addresses the one-bit array again, this time to clear it. At flush time or completion time, active ITAG targets 402 generates a clear vector based on a head-tail pointer (not shown in the Figures). The clear vector clears out the RTAG_V bit. At dispatch time, mapper 260 provides an ITAG and ITAG_V bit by source. The ITAG and ITAG_V bit are used as a read pointer for the one-bit array. The mapper sends the result to issue queue 266 as RTAG_V.

Register Pointer (RTAG) Free-List

RTAG free-list 318 provides a target RTAG to mapper 260. (Each dispatch lane 220 can handle one general purpose register and one vector scalar register RTAG per cycle.) In some embodiments, RTAG free-list 318 allocates six RTAGs per cycle (split between two super-slices). (RTAGs must be provided to mapper 260 during XFER (sx) cycle to be written in the DO cycle.) In some embodiments, the RTAG free-list releases eight RTAGs per cycle due to completion (between two super-slices. Mapper 260 releases up to eight more RTAGs during flush restore. The RTAG flushes may or may not be multiplexed with the completion release.

In some embodiments of the present invention, handshake between RTAG free-list 318 and dispatch for holding comprises at least one of the following options: (i) the RTAG free-list provides a total count of available RTAGs to dispatch; (ii) the RTAG free-list divides RTAG space based on dispatch side, and provides two counts to dispatch based on the number of entries available for each side; and/or (iii) the RTAG free-list pre-allocates RTAGs into dispatch slices and provides to dispatch a count of pre-allocated entries by slice.

Some embodiments of the present invention have multiple restore ports and a single history buffer, where the history buffer performs restores via any (or all) of the restore ports. Some embodiments have multiple history buffers where each history buffer performs restore operations via a single corresponding restore port. In still other embodiments, multiple history buffers each perform restores via multiple restore ports.

Some embodiments of the present invention may have any number of restore write ports respectively corresponding to a like number of different subsets of current register mappings.

IV. Definitions

Some acronyms that may appear throughout this disclosure, and the figures, are defined here.

GPR: general purpose register—(32-GPR, for example, is a 32-bit general purpose register).

ICT: instruction completion table—instruction tracking logic which keeps track of where (within the execution process) an instruction is, so as to complete (commit) the instruction properly.

ISSUEQ: issue queue—logic block which tracks dependencies (for example, "is source data ready?") and schedules issuance of instructions to execution units (for example, "LSU FXU . . . ").

ISU: instruction sequencing unit—includes a dispatch module, mapper, issue queue, and instruction completion table.

ITAG: instruction tag—used to track instructions flowing through a machine.

ITAG_V: validity bit for ITAG.

LREG: logical register—a logical register on which an instruction is operating.

PREG: register physical location; sometimes used synonymously with RTAG (see below).

RA; RB; RC: operand registers—source registers used by instructions for execution.

RCOV: recovery (for example, RCOV_SM (FIG. 4D) identifies a state machine that is used to recover a previous state, also sometimes herein referred to as a restore state machine).

RTAG: register tag—pointer to a register file where the associated data is located.

RTAG_V: validity bit for RTAG—indicates that resultant data, located in a register file pointed to by RTAG, is valid.

RTAG free-list:

SM: state machine.

SRC #: source—indicates one of several sources (for example, src0, src1, src2, etc.).

SS: super-slice—two slices grouped together. In some embodiments of the present invention, a super-slice may include more than two slices grouped together.

VSR: vector-scalar register; (for example, 64 VSR, for example, designates a 64-bit VSR).

WB: writeback—indication of when an instruction is done executing and is writing data to a register.

Present invention: should not be taken as an absolute indication that the subject matter described by the term "present invention" is covered by either the claims as they are filed, or by the claims that may eventually issue after patent prosecution; while the term "present invention" is used to help the reader to get a general feel for which disclosures herein are believed to potentially be new, this understanding, as indicated by use of the term "present invention," is tentative and provisional and subject to change over the course of patent prosecution as relevant information is developed and as the claims are potentially amended.

Embodiment: see definition of "present invention" above—similar cautions apply to the term "embodiment."

and/or: inclusive or; for example, A, B "and/or" C means that at least one of A or B or C is true and applicable.

Including/include/includes: unless otherwise explicitly noted, means "including but not necessarily limited to."

Receive/provide/send/input/output/report: unless otherwise explicitly specified, these words should not be taken to imply: (i) any particular degree of directness with respect to the relationship between their objects and subjects; and/or (ii) absence of intermediate components, actions and/or things interposed between their objects and subjects.

Module/Sub-Module: any set of hardware, firmware and/or software that operatively works to do some kind of function, without regard to whether the module is: (i) in a single local proximity; (ii) distributed over a wide area; (iii) in a single proximity within a larger piece of software code; (iv) located within a single piece of software code; (v) located in a single storage device, memory or medium; (vi) mechanically connected; (vii) electrically connected; and/or (viii) connected in data communication.

Computer: any device with significant data processing and/or machine readable instruction reading capabilities including, but not limited to: desktop computers, mainframe computers, laptop computers, field-programmable gate array (FPGA) based devices, smart phones, personal digital assistants (PDAs), body-mounted or inserted computers, embedded device style computers, application-specific integrated circuit (ASIC) based devices.

What is claimed is:

1. A method comprising:
    providing a first port connected to a first memory structure, a second port connected to a second memory structure, and a first restore lane that interconnects the first port and the second port;
    providing a third port connected to the first memory structure, a fourth port connected to the second memory structure, and a second restore lane that interconnects the third port and the fourth port;
    storing a first dataset, a second dataset, a third dataset, and a fourth dataset, respectively in a first storage location, a second storage location, a third storage location, and a fourth storage location of the first memory structure;
    receiving an instruction flush signal;
    in response to receiving the instruction flush signal:
        concurrently sending the first dataset and the third dataset to the second memory structure, via the first restore lane and the second restore lane respectively,
        concurrently sending the second dataset and the fourth dataset to the second memory structure, via the first restore lane and the second restore lane respectively;
    receiving an instruction dispatch signal; and
    in response to receiving the instruction dispatch signal, reading the second memory structure to determine a register source mapping based on at least one of the first dataset, the second dataset, the third dataset and the fourth dataset stored therein;
    wherein:
        the first storage location and the third storage location are connected to the first port exclusively, and
        the second storage location and the fourth storage location are connected to the third port exclusively.

2. The method of claim 1, wherein the first memory structure is a first portion of a microprocessor.

3. The method of claim 1, wherein the second memory structure is a second portion of a microprocessor.

4. The method of claim 1, wherein each of the first dataset, the second dataset, the third dataset, and the fourth dataset comprises at least one of the following data fields:
    an entry validity bit;
    an evictor instruction tag;
    and evictor instruction tag validity bit;
    an instruction tag;
    an instruction tag validity bit;
    a logical register;
    a register tag;
    a restore required bit; and
    and a release required bit.

5. The method of claim 2 wherein the first portion of the microprocessor is a history buffer.

6. The method of claim 3 wherein the second portion of the microprocessor is a working set portion of a logical-register-to-register-tag mapper.

7. A microprocessor structured to perform:
    providing a first port connected to a first memory structure, a second port connected to a second memory structure, and a first restore lane that interconnects the first port and the second port;
    providing a third port connected to the first memory structure, a fourth port connected to the second memory structure, and a second restore lane that interconnects the third port and the fourth port;
    storing a first dataset, a second dataset, a third dataset, and a fourth dataset, respectively in a first storage location, a second storage location, a third storage location, and a fourth storage location of the first memory structure;

receiving an instruction flush signal;
in response to receiving the instruction flush signal:
concurrently sending the first dataset and the third dataset to the second memory structure, via the first restore lane and the second restore lane respectively,
concurrently sending the second dataset and the fourth dataset to the second memory structure, via the first restore lane and the second restore lane respectively;
receiving an instruction dispatch signal; and
in response to receiving the instruction dispatch signal, reading the second memory structure to determine a register source mapping based on at least one of the first dataset, the second dataset, the third dataset and the fourth dataset stored therein;
wherein:
the first storage location and the third storage location are connected to the first port exclusively, and
the second storage location and the fourth storage location are connected to the third port exclusively.

8. The microprocessor of claim 7, wherein the first memory structure is a first portion of the microprocessor.

9. The microprocessor of claim 7, wherein the second memory structure is a second portion of the microprocessor.

10. The microprocessor of claim 7, wherein each of the first dataset, the second dataset, the third dataset, and the fourth dataset comprises at least one of the following data fields:
an entry validity bit;
an evictor instruction tag;
and evictor instruction tag validity bit;
an instruction tag;
an instruction tag validity bit;
a logical register;
a register tag;
a restore required bit; and
and a release required bit.

11. The microprocessor of claim 8 wherein the first portion of the microprocessor is a history buffer.

12. The microprocessor of claim 9 wherein the second portion of the microprocessor is a working set portion of a logical-register-to-register-tag mapper.

13. A computer program product comprising:
one or more computer readable storage media and program instructions stored on the one or more computer readable storage media, the program instructions comprising instructions to perform:
providing a first port connected to a first memory structure, a second port connected to a second memory structure, and a first restore lane that interconnects the first port and the second port,
providing a third port connected to the first memory structure, a fourth port connected to the second memory structure, and a second restore lane that interconnects the third port and the fourth port,
storing a first dataset, a second dataset, a third dataset, and a fourth dataset, respectively in a first storage location, a second storage location, a third storage location, and a fourth storage location of the first memory structure,
receiving an instruction flush signal;
in response to receiving the instruction flush signal:
concurrently sending the first dataset and the third dataset to the second memory structure, via the first restore lane and the second restore lane respectively,
concurrently sending the second dataset and the fourth dataset to the second memory structure, via the first restore lane and the second restore lane respectively;
receiving an instruction dispatch signal; and
in response to receiving the instruction dispatch signal, reading the second memory structure to determine a register source mapping based on at least one of the first dataset, the second dataset, the third dataset and the fourth dataset stored therein;
wherein:
the first storage location and the third storage location are connected to the first port exclusively, and
the second storage location and the fourth storage location are connected to the third port exclusively.

14. The computer program product of claim 13, wherein the first memory structure is a first portion of a microprocessor.

15. The computer program product of claim 13, wherein the second memory structure is a second portion of a microprocessor.

16. The computer program product of claim 13, wherein each of the first dataset, the second dataset, the third dataset, and the fourth dataset comprises at least one of the following data fields:
an entry validity bit;
an evictor instruction tag;
and evictor instruction tag validity bit;
an instruction tag;
an instruction tag validity bit;
a logical register;
a register tag;
a restore required bit; and
and a release required bit.

17. The computer program product of claim 14 wherein the first portion of the microprocessor is a history buffer.

18. The computer program product of claim 15 wherein the second portion of the microprocessor is a working set portion of a logical-register-to-register-tag mapper.

19. The computer program product of claim 13 wherein:
the computer program product is a computer system; and
the computer program product further comprises a processor(s) set structured and/or connected in data communication with a storage medium such that the processor(s) set executes computer instructions stored on the storage medium.

* * * * *